United States Patent

[11] 3,622,836

[72] Inventor Asger Torben Nielsen
San Diego, Calif.
[21] Appl. No. 715,896
[22] Filed Mar. 25, 1968
[45] Patented Nov. 23, 1971
[73] Assignee Eastman Kodak Company
Rochester, N.Y.

[54] DEFLECTION AMPLIFIER WITH DYNAMIC FOCUS CONTROL
6 Claims, 2 Drawing Figs.

[52] U.S. Cl. 315/27 TD, 315/22, 315/31 TV
[51] Int. Cl. H01j 29/76
[50] Field of Search 315/22, 31, 27 TD, 22

[56] References Cited

UNITED STATES PATENTS

| | | | |
|---|---|---|---|
| 2,220,303 | 10/1940 | Tingley | 315/22 |
| 2,196,838 | 4/1940 | Rogowski | 315/22 |
| 3,426,245 | 2/1969 | Yurasek | 315/27 TD |
| 3,252,045 | 5/1966 | Griffin | 315/27 TD |

OTHER REFERENCES

Soller, Starr and Valley, Cathode-Ray Tube Displays, 1948, pp. 102 and 103.

Soller, Cathode-Ray Tube Displays, 1948, pp. 26 and 27.

Froess, IBM Tech. Discl. Bull., Vol. 11, No. 10, pg. 1,365 (Mar. 1969)

*Primary Examiner*—Rodney D. Bennett, Jr.
*Assistant Examiner*—Joseph G. Baxter
*Attorneys*—Robert W. Hampton and Daniel E. Sragow

ABSTRACT: A deflection amplifier is provided which includes diodes in its output which disconnect the output drive from the deflection yoke during a transient so that the amplifier will not go into saturation and thus is able to regain control when the transient returns from its peak. There is also provided a novel dynamic focus control in which dynamic focus coils are connected in series with the deflection yokes so that the change in focus is proportional to the extent of the deflection.

ASGER T. NIELSEN
INVENTOR.

BY Daniel E. Sragow
Robert W Hampton
ATTORNEYS

DEFLECTION AMPLIFIER WITH DYNAMIC FOCUS CONTROL

BACKGROUND OF THE INVENTION

In the prior art there have been difficulties with providing a linear high-speed sweep on a magnetically deflected cathode-ray tube. This has been due to the fact that the inductance of the deflection coil tended to oppose the change in the flux. This opposition tended to saturate the amplifier which drives the deflection yoke thus rendering it nonresponsive until some time after the peak has subsided.

There had been a further problem with cathode-ray-tube-display systems in that when using a static-focusing arrangement the beam would be in focus at only a particular point on the tube and not at other points. In the prior art this problem was partially solved by adjusting the focusing field so that the beam was exactly in focus midway between the center and the edge of the tube so that the error in focus was split between the center and edge of the tube. The problem was completely solved by providing an analog computer which actually changed the focusing field in response to the amount of deflection. The first solution was not completely adequate. The second solution has required a complicated analog computer.

SUMMARY OF THE INVENTION

It is therefore an object of the invention to provide a deflection amplifier which is not saturated by the reaction of the deflection yoke to a transient.

It is a further object of the invention to provide a dynamic-focusing arrangement which does not require an analog computer.

The above objects are attained by providing a deflection amplifier with diodes in its output so that the deflection amplifier is shut off when the deflection yoke reacts to a transient. Also provided are supplemental focusing coils which are connected so as to carry a current which is proportional to the current passing through the deflection yoke in order to provide dynamic focusing.

Other objects and advantages of the invention will appear from the following description when read with the drawing.

DESCRIPTION OF THE PREFERRED EMBODIMENT

Figure 1:
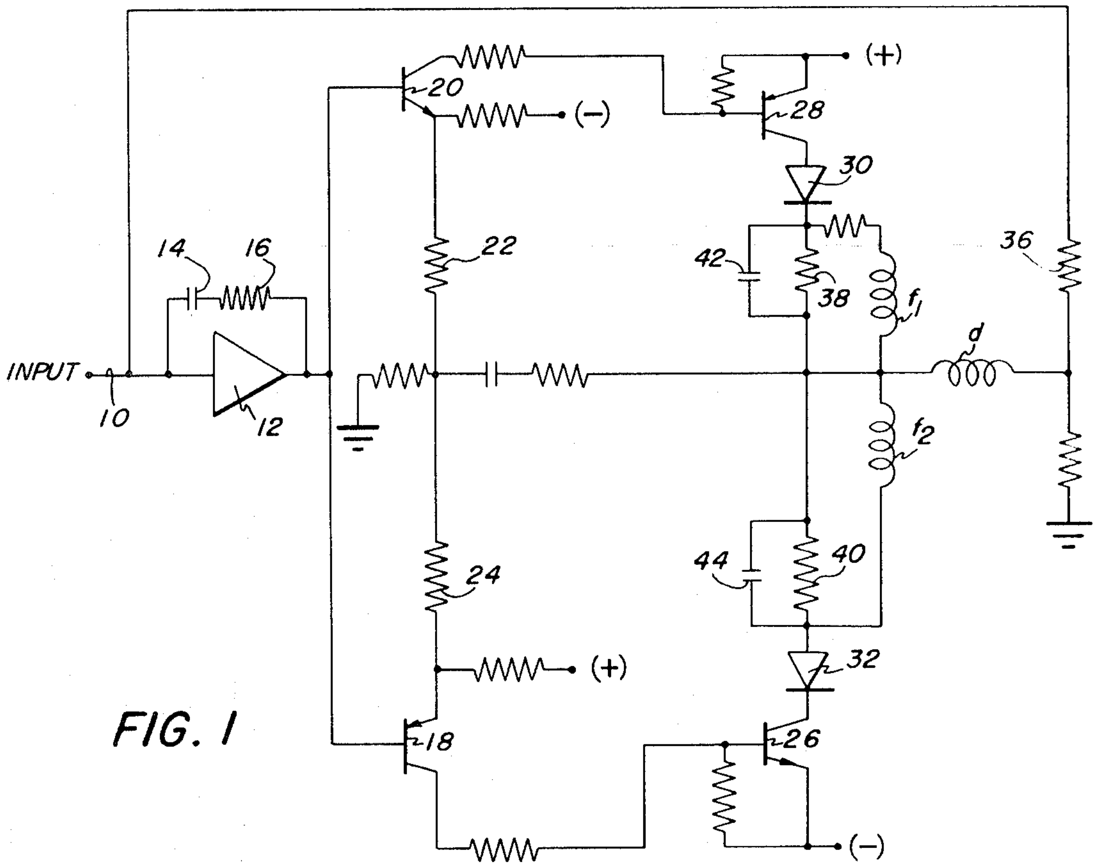
FIG. 1 shows a circuit diagram of a deflection amplifier and dynamic focusing arrangement according to the invention.

FIG. 1 shows a circuit diagram of a deflection amplifier for only one plane of deflection; i.e., either X or Y. It is to be understood that a duplicate circuit would be used for the other plane of deflection.

Input lead 10 is coupled to a source of deflection signals. These signals are fed to amplifier 12 which is bridged by capacitor 14 and resistor 16, which in combination with the power stages act as an operational amplifier having a voltage gain of less than unity but having a large current gain.

The output of amplifier 12 is fed to the bases of transistors 18 and 20. When there is no input to amplifier 12, the output of the amplifier 12 floats at approximately ground. When the input of the amplifier 12 goes either positive or negative the output correspondingly goes negative or positive.

Transistors 18 and 20 are biased so that when there is no input signal, both transistors 18 and 20 are conducting slightly. When the output of amplifier 12 goes positive PNP-transistor 18 is turned off and NPN-transistor 20 is turned on. Conversely, when the output of amplifier 12 goes negative, transistor 20 is turned off and transistor 18 is turned on. It is to be noted that the junction between the resistors 22 and 24 is held at approximately ground potential in order to maintain stability.

As mentioned above, when there is no signal, transistors 18 and 20 are slightly conducting. When transistors 18 and 20 are conducting, transistors 26 and 28 are also conducting. This provides an equal current through transistors 26 and 28, thus holding the junction of focus coils $f_1$ and $f_2$ at approximately ground potential, thus eliminating any current through deflection coil d. When transistor 20 conducts and transistor 18 shuts off, PNP-transistor 28 conducts and NPN-transistor 26 is cut off. This drives a current from the transistor 28 through diode 30, focus coil $f_1$, and deflection coil *d* to ground. Since transistor 26 is cut off at this time, no current flows through deflection coil *d* in the opposite direction or through focus coil $f_2$. Conversely, when transistor 18 is conductive and transistor 20 is nonconductive, transistor 26 is conductive and transistor 28 is nonconductive, thus drawing a current from ground through deflection coil *d* and focus coil $f_2$.

Figure 2:
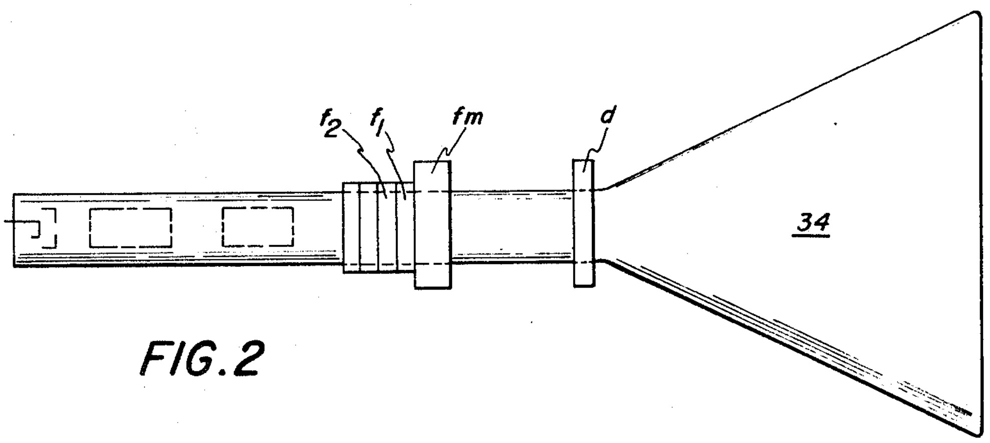
FIG. 2 is a schematic showing of the positioning of the deflection and focusing coils in a typical cathode-ray tub apparatus.

Referring to FIG. 2 there is shown a conventional cathode-ray tube 34 which employs magnetic deflection and focusing. The deflection coil *d* is mounted in a conventional manner at the junction between the cone and the neck of the tube. The main focus coil $f_m$ is mounted somewhere behind the deflection yoke. The dynamic focus coils $f_1$ and $f_2$ are mounted immediately behind the main deflection coil *d*. FIG. 2 shows two additional dynamic focus coils behind coils $f_1$ and $f_2$. These are dynamic focus coils for the other plane of deflection which has not been shown, but which would be identical to the ones shown. It is to be understood that all the focus coils could be wound together if desired or in any combination.

The deflection function operates as follows:

When there is a change in deflection, the current through the deflection coil *d* changes rather abruptly. This causes a very high back voltage which would normally saturate transistors 26 and 28. However, diodes 30 and 32 prevent the high back voltage from reaching transistors 26 and/or 28, thus effectively disconnecting deflection coil *d* from transistors 28 and 40. Since the parameters of deflection yoke *d* have been proportioned so that the yoke is critically damped, the back voltage reaches its peak and returns to the supply voltage of transistors 26 and 28 in approximately one-quarter cycle. When the coil returns to this voltage, diodes 30 and 32 immediately turn on, thus permitting transistors 26 and 28 to regain control immediately rather than having to recover from the transient as would be the case if diodes 30 and 32 were absent.

It is to be noted that there is a feedback path through resistor 36 to input 10. This couples the back voltage from the deflection yoke directly back to the input. However, amplifier 12 has been chosen with a relatively slow response so that the transient is not coupled to the output of amplifier 12 until after transistors 26 and 28 have regained control.

Dynamic Focus

Since it is desirable to have the beam in focus at all points along the face of the tube, the focusing current must be changed in accordance with the deflection of the beam. According to the invention the current through main focus coil $f_m$ is adjusted so that the beam is precisely in focus at the center of the tube, i.e., when no current is applied to the deflection yoke *d*. When current is passed through the deflection *d* to ground, a magnetic field is created by focus coil $f_1$ which is in opposition to the field generated by the main focus coil $f_m$. The result is that the focal length of the combined main focus coil and dynamic coil becomes longer, thereby correcting for the defocusing effect caused by deflection of the electron beam away from the center of the cathode-ray tube. When current is passed from ground through the deflection *d* and through focus coil $f_2$ the same end result is achieved because the direction of the windings in coil *f2* is opposite that of coil $f_1$.

Capacitors 42 and 44 merely bypass the transients generated by deflection yoke *d* so that the focus is not affected by transients but only by the deflection current itself.

Since the system has been arranged so that the beam is in focus at the center of the tube when no current is passing through the deflection yoke, it is evident that the change in focus must be the same whether the current through the deflection coil is positive or negative. This is the reason that two dynamic focus coils $f_1$ and $f_2$ are used. When transistor 28 is conductive, dynamic focus coil $f_1$ is energized in an amount proportional to the current flowing through deflection yoked 8. This changes the magnetic field produced by focus coil $f_m$ in the manner described above so that the focal point is extended farther from the deflection *d.*

It is, of course, to be understood that the main focus coil $f_m$ is supplied by a fixed DC current which is not shown. It is further to be again pointed out that only the circuitry for one axis has been shown. It is to be understood that duplicate circuitry would be used for the remaining two dynamic focus coils and for the remaining winding on the deflection yoke.

Although the invention has been described in considerable detail with reference to a certain preferred embodiment thereof; it will be understood that variations and modifications can be effected without departing from the spirit and scope of the invention as described hereinabove and as defined in the appended claims.

I claim:

1. Focusing apparatus for use with an electron discharge device having a target element with a selected portion and means for generating and directing a beam of electrons towards the selected portion, said focusing apparatus comprising:

a. means for focusing the beam of electrons and for providing a maximum-focusing effect when the beam of electrons is directed towards the selected portion;
b. deflection means for deflecting the beam of electrons from said selected portion in a first direction and for deflecting the beam of electrons from the selected portion in a second direction substantially opposite to the first direction;
c. first supplementary focus means coupled to said deflection means for providing focusing action upon the beam of electrons as a function of the degree of deflection of the beam of electrons in the first direction;
d. second supplementary focus means coupled to said deflection means for providing focusing action upon the beam of electrons as a function of the degree of deflection of the beam of electrons in the second direction; and
e. first and second switch means coupled respectively to said first and second supplementary focus means for alternately establishing a first circuit path through said first supplementary focus means and said deflection means, and a second circuit path through said second supplementary focus means and said deflection means respectively.

2. Focusing apparatus for use with an electron discharge device having means for directing a beam of electrons onto a selected portion of a target element, said apparatus comprising:

a. means for focusing the beam of electrons and for providing a maximum focusing effect when the beam of electrons is directed towards the selected portion;
b. deflection means for deflecting the beam of electrons from the selected portion in a first direction and for deflecting the beam of electrons from the selected portion in a second direction substantially opposite to the first direction;
c. a first supplementary focus coil connected to said deflection means for providing a focusing action upon the beam of electrons as a function of the deflection of the beam of electrons in the first direction;
d. a second supplementary focus coil connected to said deflection means for providing a focusing action upon the beam of electrons as a function of the deflection of the beam of electrons in the second direction; and
e. first and second transistors of opposite conductivity types coupled respectively to said first and second supplementary focus coils for alternately establishing a first current path through said first supplementary focus coil and said deflection means, and a second current path through said second supplementary focus coil and said deflection means respectively.

3. Apparatus as claimed in claim 2 wherein there is included first and second diodes respectively connected in circuit between said first transistor and said first supplementary focus coil to isolate said first transistor when the second current path is established through said second supplementary focus coil and said deflection means, and connected in circuit between said second transistor and said second supplementary focus coil for isolating said second transistor when the first current path is established through said first supplementary focus coil and said deflection means.

4. A dynamic focus device for a magnetically focused and magnetically deflected cathode-ray tube having a main focus coil and a deflection yoke comprising:

a first supplementary focus coil adjacent to said main focus coil, said first supplementary focus coil being connected in a series with said deflection yoke so that said first supplementary focus coil passes a current which is proportional to the current passing through said deflection yoke; and a second supplementary focus coil connected to said fist supplementary focus coil.

5. A dynamic focus device for a cathode-ray tube having an electron gun and a relatively flat face, said gun being adapted to project an electron beam to said face to form a spot on said face, said beam when undeflected being projected in the vicinity of the center of the face of said tube, the combination comprising:

a. means for focusing said spot to its minimum size when the beam is at the center of said tube,
b. first deflection means for deflecting said beam from the approximate center of said tube in a first direction,
c. second deflection means for deflecting said beam from the approximate center of said tube in a second direction substantially opposite to said first direction,
d. first dynamic focus means responsive to operation of said first deflection means for maintaining said minimum spot size when said first deflecting means causes said beam to be deflected, and
e. second dynamic focus means responsive to operation of said second deflection means for maintaining said minimum spot size when said second deflection means causes said beam to be deflected.

6. A device for supplying deflection currents to a cathode-ray tube which is both deflected and focused magnetically, and for dynamically maintaining the focus of said cathode-ray tube, said cathode-ray tube having a deflection yoke and a main-focusing coil, comprising:

a. a pair of supplementary focus coils located in the immediate vicinity of said main focus coil;
b. a pair of diodes; and
c. a PNP-transistor and an NPN-transistor, said transistors each having base, collector, and emitter electrodes, the collectors of said transistors being coupled together through said diodes and said supplementary focus coils, said deflection yoke being coupled to said supplementary focus coils.

* * * * *